United States Patent
Kim

(10) Patent No.: US 7,352,677 B2
(45) Date of Patent: Apr. 1, 2008

(54) PROBE-BASE STORAGE APPARATUS HAVING REDUNDANCY CANTILEVERS

(75) Inventor: Young Sik Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 436 days.

(21) Appl. No.: 10/776,533

(22) Filed: Feb. 12, 2004

(65) Prior Publication Data
US 2004/0160883 A1 Aug. 19, 2004

(30) Foreign Application Priority Data
Feb. 14, 2003 (KR) .................. 10-2003-0009530

(51) Int. Cl.
*G11B 7/00* (2006.01)
(52) U.S. Cl. ....................... 369/101; 369/126
(58) Field of Classification Search .............. 369/126, 369/101; *G11B 7/00, 9/10*
See application file for complete search history.

(56) References Cited

U.S. PATENT DOCUMENTS

| | | | | |
|---|---|---|---|---|
| 4,408,306 A | * | 10/1983 | Kuo | .................. 365/218 |
| 5,208,782 A | * | 5/1993 | Sakuta et al. | .......... 365/230.03 |
| 5,394,388 A | * | 2/1995 | Hatanaka et al. | ............ 369/126 |
| 6,259,636 B1 | * | 7/2001 | Fukuda et al. | .............. 365/200 |
| 6,373,762 B2 | * | 4/2002 | Morgan | ...................... 365/201 |
| 6,529,420 B2 | * | 3/2003 | Lee et al. | .............. 365/189.07 |

OTHER PUBLICATIONS

P. Vettiger et al., "The Millipede—More than one thousand tips for future AFM data storage", IBM J. Res. Develop., vol. 44, No. 3, May 2000, pp. 323-340.

* cited by examiner

*Primary Examiner*—A M Psitos
(74) *Attorney, Agent, or Firm*—Birch, Stewart, Kolasch & Birch, LLP

(57) ABSTRACT

A header of a nano storing apparatus is disclosed. If some cantilevers of the header are defective, an additional extra cantilever array is substitutively used. The header of a nano storing apparatus including: a cantilevery array including cantilevers each having a probe that is able to read and write information of the 'n' number of rows and the 'm' number of columns, an X-redundancy cantilever array to be used as a substitute when cantilever probes of a specific row in the cantilever array are defective; a Y-redundancy cantilever array to be used as a substitute when cantilever probes of a specific column in the cantilever array are defective; and a header controller for controlling each part.

10 Claims, 4 Drawing Sheets

PROBE-BASE STORAGE APPARATUS HAVING REDUNDANCY CANTILEVERS

This Nonprovisional application claims priority under 35 U.S.C. 119(a) on Patent Application No(s). 10-2003-0009530 filed in KOREA on Feb. 14, 2003, the entire contents of which are hereby incorporated by reference.

BACKGROUND OF THE INVENTION

1. Field of the Invention

The present invention relates to a nano storing apparatus and, more particularly, to a header of a nano storing apparatus capable of being used in a proper state by substitutively using an additional extra cantilever array if some cantilevers of the header are defective in its manufacturing.

2. Description of the Background Art

In general, an atomic force microscope (AFM) is a device for measuring a surface form by using an infinitesimal probe positioned at an end of a bar called a cantilever. The probe with a size of a few nm is formed at the end of the cantilever, and a surface form and an electric or magnetic quality of a test sample can be known by measuring atomic power between the probe and the test sample.

Recently, researches are actively ongoing on a nano-lithography or a nano data storage apparatus using such a principle of the AFM.

In addition, a data storing apparatus that is able to have a storage density of $Tbit/in_2$ or higher can be developed by using the probe with the size of a few nm by adopting the principle of the AFM.

The IBM has studied for an information storing apparatus using a polymer material such as PMMA (Poly Methyl Methacrylate) as a recording medium by applying the principle of the AFM (IBM J. RES. DEVELOP. Vol. 44 No. 3 2000, pp. 323-340). The AFM (Atomic Force Microscop) information storing apparatus of the IBM includes 32×32 cantilevers by connecting cantilevers two-dimensionally. The cantilever includes a silicon probe, a resistive heater formed around the probe and a silicon cantilever.

FIG. 1 is an exemplary view showing a general nano storing apparatus using a probe.

As shown in FIG. 1, the nano storing apparatus includes a header 100 for reading and writing information, a media 200 for storing information, and a scanner 300 for moving the media.

In the nano storing apparatus, a writing operation is performed such that in a state that a polymer recording medium (that is, viscosity is reduced) is softened, a local force is applied to the recording medium with a cantilever tip to form a bit indentation at the recording medium to write information.

Meanwhile, as for a reading operation, when the tip enters the bit indentation, the recording medium and the cantilever heater near each other so that the heater of the cantilever is quickly cooled, whereas when the tip passes on the smooth surface, the recording medium and the cantilever heater are distanced so that the cantilever heater is slowly cooled. Thanks to the difference of the cooling speed, the temperature of the heater differs, which causes a difference in an electric resistance. By using the difference in the electric resistance, information can be reproduced.

As the nano storing apparatus using the AFM probe, besides the IBM method, various storing apparatuses have been proposed including a recording apparatus using ferro-electrics such as PZT and a recording apparatus using a phase transformation material.

However, as for every nano storing apparatus using the AFM probe, if some probes fail to perform its function properly due to a problem in a manufacturing process or due to a negligence in handing, the nano storing apparatus can not be used. Then, a manufacturing yield of the nano storing apparatus is much degraded.

SUMMARY OF THE INVENTION

Therefore, an object of the present invention is to provide a header of a nano storing apparatus capable of increasing a production yield by substitutively using additional redundancy cantilever array if some cantilevers of the header are defective in manufacturing.

To achieve these and other advantages and in accordance with the purpose of the present invention, as embodied and broadly described herein, there is provided a header of a nano storing apparatus including: a cantilever array including cantilevers, each having a probe that is able to read and write information, of the 'n' number of rows and the 'm' number of columns (n, m=1, 2, 3, . . . ); an X-redundancy cantilever array to be used as a substitute when cantilever probes of a specific row in the cantilever array are defective; a Y-redundancy cantilever array to be used as a substitute when cantilever probes of a specific column in the cantilever array are defective; and a header controller for controlling each part.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
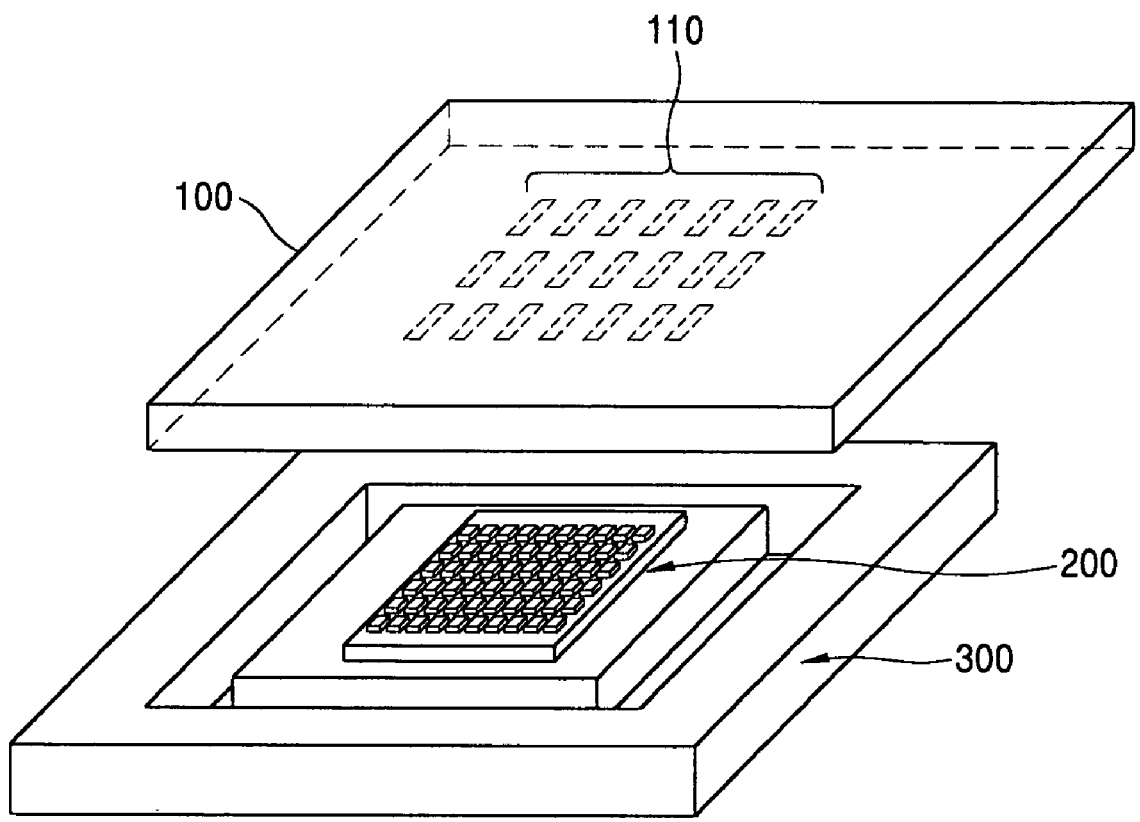
FIG. 1 is an exemplary view showing a general nano storing apparatus using a probe.
Figure 2:
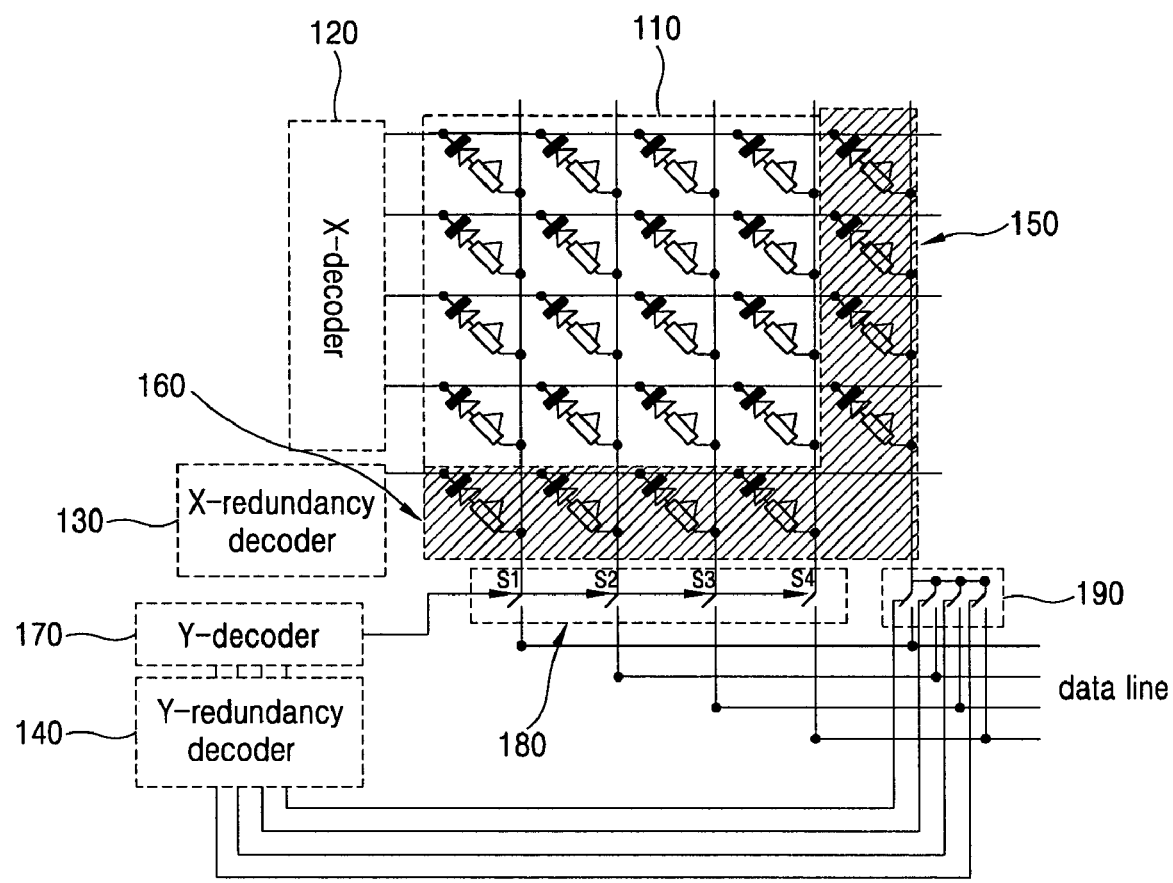
FIG. 2 illustrates the construction of a header of a nano storing apparatus in accordance with the present invention.

FIG. 2 illustrates the construction of a header of a nano storing apparatus in accordance with the present invention.

As shown in FIG. 2, a header of a nano storing apparatus of the present invention includes: an n×m cantilevers array in which cantilevers, each having a probe that is able to read and write information, are arranged in the 'n' number of rows and the 'm' number of columns (n,m=1, 2, 3, . . . ); a Y-redundancy cantilever array 150 having cantilevers arranged in the 'n' number of rows and the 'k' number of columns (k≦m, k=1, 2, 3, . . . ), of which a specific column will be substitutively used for defective cantilever probes of a specific column in the n×m cantilevers array; an X-redundancy cantilever array 160 having cantilevers arranged in the 'p' number of rows and the 'm' number of columns (p≦n, p=1, 2, 3, . . . ), of which a specific row will be substitutively used for defective cantilever probes of a specific row in the n×m cantilevers array; and a header controller consisting of an X-decoder 120 for controlling each part, an X-redundancy decoder 130, a Y-decoder 170 and a Y-redundancy decoder 140.

The header controller will now be described in detail.

The header control part includes the X-decoder 120 for receiving an X-address signal and driving cantilevers of a specific row in the cantilever array 110; the X-redundancy decoder 130 for stopping driving of the X-decoder 120 when cantilevers of a specific row in the cantilever array 110 are defective and selecting the X-redundancy cantilever array 160; the Y-decoder 170 for receiving an Y-address signal and driving cantilevers of a specific column in the cantilever array 110; and the Y-redundancy decoder 140 for stopping driving of the Y-decoder 170 and selecting the Y-redundancy cantilever array 150 when cantilevers of a specific column in the cantilever array 110 are defective.

The header controller may further include a Y-switch 180 for receiving an output signal of the Y-decoder 170 and cutting off a data output of cantilevers of a specific column when the cantilevers of the specific column in the cantilever array 110 are defective; and a Y-redundancy switch 190 for receiving an output signal of the Y-redundancy decoder 140 and switching a data output of the Y-redundancy cantilever array 150 when cantilevers of a specific column in the cantilever array are defective.

Figure 3:
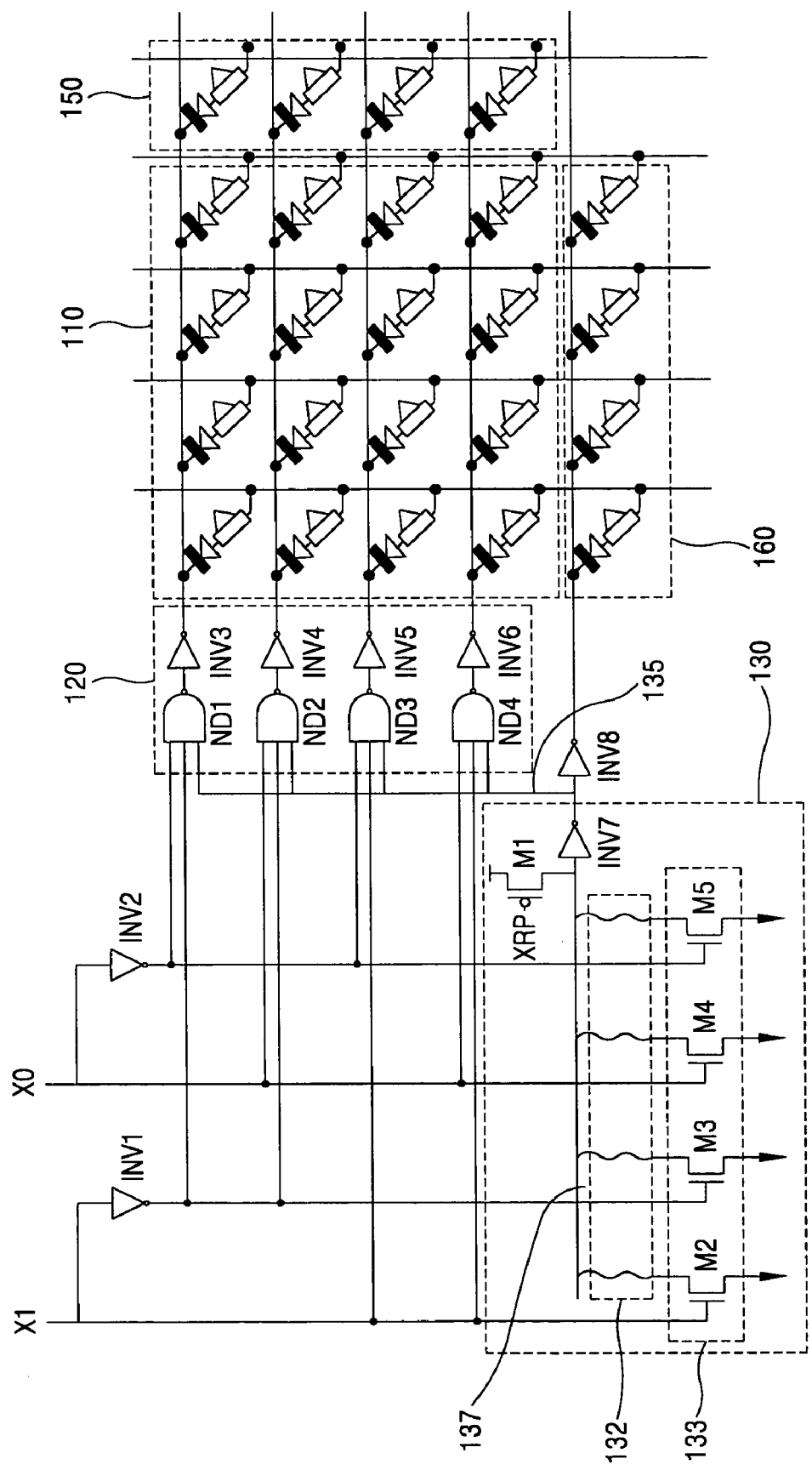
FIG. 3 is a detailed circuit diagram of an X-decoder and an X-redundancy decoder of the nano storing apparatus in accordance with the present invention.

FIG. 3 is a detailed circuit diagram of the X-decoder and the X-redundancy decoder of the nano storing apparatus in accordance with the present invention.

As shown in FIG. 3, the X-decoder 120 includes NAND gates (ND1, ND2, ND3 and ND4) and inverters (INV3, INV4, INV5 and INV6) connected thereto, in order to drive the cantilever array 110 upon receiving an X-address signal or stop the cantilever array 110 upon receiving a signal from the X-redundancy decoder 130. Namely, the X-decoder 120 selects a specific row in the n×m cantilevers array 110 and drives it upon receiving an X-address (X0, X1) signal and a signal generated from the X-redundancy decoder 130. At this time, when the X-redundancy cantilever 160 is selected, the X-decoder is turned off.

The X-redundancy decoder 130 includes an output terminal 137 for outputting a stop signal to the X-decoder 120 when cantilevers of a specific row in the cantilever array 110 are defective; a unit 131 for transferring a high voltage ($V_{CC}$) to the output terminal 137 by a specific pulse signal (XRP); a unit 133 for receiving the X-address signal and transferring a low voltage (0V) to the output terminal; and a plurality of fuses 132 connected between the output terminal 137 and the unit 133 which transfers the low voltage, and selectively defused when cantilevers of a specific row in the cantilever array 110 are defective.

With this structure, the output terminal 137 of the X-redundancy decoder converts signal values received from the high voltage outputting unit 131 and the low voltage outputting unit 133 into logical values and outputs corresponding signal logical values to the X-decoder and the X-redundancy cantilever. At this time, when the defective cantilevers of the specific row in the cantilever array are selected, the X-redundancy decoder 130 turns off the X-decoder 120 and outputs a signal to select the X-redundancy cantilever array 160.

The operations according to the above-described construction will now be described.

In the conventional art, if some cantilevers are defective in the cantilever array, the header can not be used any longer, but comparatively in the header of the present invention, defective cantilevers in the row in the cantilever array are substituted by the X-redundancy cantilever array, so that the header can be used.

For example, it is assumed that the header of the nano storing apparatus includes a cantilever array having 4×4 cantilevers and an X-redundancy cantilever array having 1×4 cantilevers, and three cantilevers in second, third and fourth columns of the second row in the 4×4 cantilevers array are defective. At this time, if X0 signal is '1' and X1 signal is '0', the fuse 132 connected to the two NMOS transistors M3 and M4 in the X-redundancy decoder 130 are defused. In other words, in the case that there are defective cantilevers arranged in the row, the fuse at the portion corresponding to the X-address of the damaged cantilevers is physically cut off. And then, when a specific pulse signal (XRP) is applied to the PMOS transistor (M1) to charge the output terminal 137 with $V_{CC}$ voltage, '0' is inputted to the other two NMOS transistors M2 and M5 of the low voltage transferring unit 133, so the output terminal 137 is charged only with $V_{CC}$ voltage.

Accordingly, an output of the inverter INV7 is changed to a low voltage (0V), a high voltage is outputted from the NAND gates (ND1, ND2, ND3 and ND4), and a low voltage (0V) is outputted from the X-decoder 120 through the inverters INV3, INV4, INV5 and INV6, so that the cantilever array 110 is not driven.

Meanwhile, an output through the inverter INV7 in the X-redundancy decoder 130 is applied as a high voltage to the X-redundancy array 160 through the inverter INV8, so the X-redundancy array 160 is driven.

Accordingly, when the column including the defective cantilevers is selected, the X-redundancy decoder 130 turns off the X-decoder 120 and generates a signal for selecting the X-redundancy cantilever array 160.

Fuse defusing methods include an electric fuse method for defusing the fuse with an overcurrent, a method for making a junction short by laser beam, and a method for programming with an EPROM memory cell, and the like. Among them, the method for cutting off the fuse by laser is commonly used thanks to its simplicity and reliability. For a material of the fuse, a polysilicon line or a metal line is used.

Figure 4:
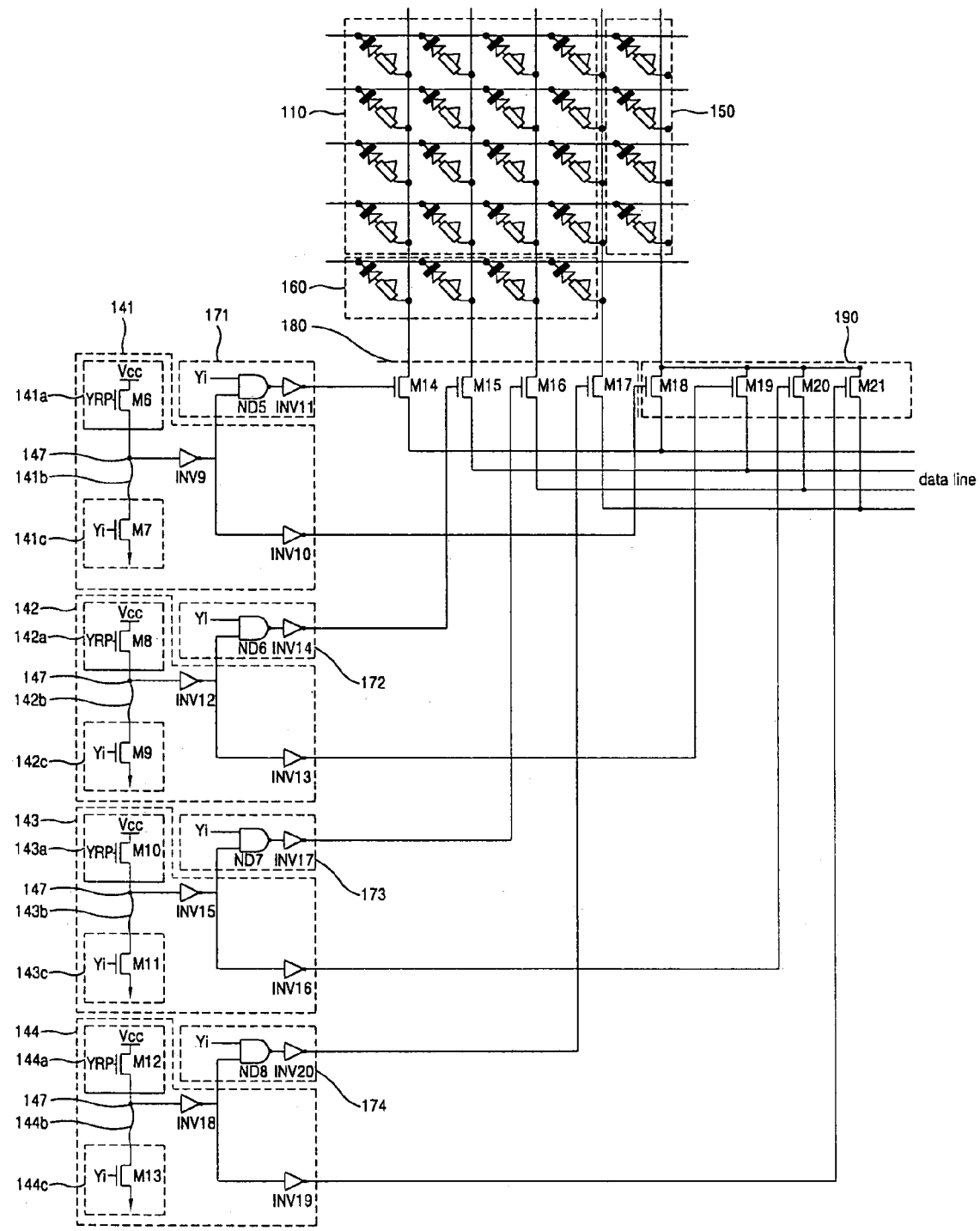
FIG. 4 is a detailed circuit diagram of a Y-decoder and a Y-redundancy decoder of the nano storing apparatus in accordance with the present invention.

FIG. 4 is a detailed circuit diagram of a Y-decoder and a Y-redundancy decoder of the nano storing apparatus in accordance with the present invention.

As shown in FIG. 4, the header of the nano storing apparatus in accordance with the present invention includes: a cantilever array having 4×4 cantilevers; Y-decoders 171, 172, 173 and 174 and Y-redundancy decoders 141, 142, 143 and 144 provided as many as the columns of the cantilever array; a Y-switch 180 for receiving output signals of the Y-decoders 171, 172, 173 and 174 when cantilevers of a specific column in the cantilever are defective, and cutting off a data output of the defective cantilevers; and a Y-redundancy switch 190 for receiving output signals of the Y-redundancy decoders 141, 142, 143 and 144 when cantilevers of a specific column in the cantilever are defective, and switching a data output of the Y-redundancy cantilever array.

The Y-decoders 171, 172, 173 and 174 include NAND gates (ND5, ND6, ND7 and ND8) and inverters (INV11, INV14, INV17 and INV20) for receiving the Y-address signal and signals from the Y-redundancy decoders 141, 142, 143 and 144 and turning on or off a switch of the Y-switch 180, so as to enable a data output or stop data output to the cantilevers of a specific column in the cantilever array 110.

Accordingly, the Y-decoders 171, 172, 173 and 174 receive the Y-address signal and the signals generated from the Y-redundancy decoders 141, 142, 143 and 144, and selects a specific column (m) from the n×m cantilevers array 110 and drive it.

Meanwhile, the Y-redundancy decoders 141, 142, 143 and 144 include an output terminal 147 for outputting a stop signal to the Y-decoders 171, 172, 173 and 174 when cantilevers in a specific column in the cantilever array 110 are defective; units 141a, 142a, 143a and 144a for transferring a high voltage ($V_{CC}$) to the output terminal 147 by a specific pulse signal (YRP); units 141c, 142c, 143c and 144c for receiving a Y-address signal and transferring a low voltage (0V) to the output terminal 147; and a plurality of fuses 141b, 142b, 143b and 144b connected between the output terminal 147 and the low voltage transferring units 141c, 142c, 143c and 144c, and selectively defused when cantilevers of a specific column in the cantilever array 110 are defective.

For example, operations of the Y-decoders 171, 172, 173 and 174 and the Y-redundancy decoders 141, 142, 143 and 144 of a header of a nano storing apparatus including a cantilever array having 4×4 cantilevers and a Y-redundancy cantilever array having 1×4 cantilevers will now be described, in which it is assumed that three cantilevers in the second, third and fourth rows of the second column in the cantilever array are defective.

First, since the three cantilevers in the second, third and fourth rows of the second column are defective, a fuse of the Y-redundancy decoder 142 is defused and the VCC voltage is charged through a PMOS transistor M8 at an output point. An output of the inverter INV12 is 0V, the NAND gate ND6 of the corresponding Y-decoder 172 outputs a high voltage, and the inverter INV14 connected to the NAND gate ND6 outputs a low voltage, so that a switching device M15 of the Y-switch 180 is turned off, and thus, a data output of the defective cantilevers are cut off.

Thereafter, an output of the inverter INV12 is outputted as a high voltage through the inverter INV13 and a switching device 19 of the Y-redundancy switch 190 is turned on, and thus, data of the Y-redundancy cantilever 150 is outputted.

IN this manner, by substituting the defective cantilevers with the redundancy cantilever array, the header of the nano storing apparatus can be driven.

As so far described, the header of a nano storing apparatus in accordance with the present invention has the following advantage.

That is, if some cantilevers of a cantilever array are defective, they are substituted with an additional redundancy cantilever array for use. Thus, a production yield of the nano storing apparatus can be enhanced by solving the problem of the conventional art that defective cantilevers are discarded.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A storage apparatus comprising:
    a cantilevery array cantilever probes;
    an X-redundancy cantilever array configured to read and write information when at least one cantilever probe of a specific row in the cantilever array is defective;
    a Y-redundancy cantilever array configured to read and write information when at least one cantilever probe of a specific column in the cantilever array is defective; and
    a redundancy cantilever array controller configured to determine that a corresponding cantilever probe is defective when the corresponding cantilever probe is unable to read and write information, and configured to select the X-redundancy cantilever array and the Y-redundancy cantilever array when the at least one cantilever probe of the specific row and of the specific column in the cantilever array is defective,
    wherein the redundancy cantilever controller comprises:
    an X-decoder configured to receive an X-address signal and to drive cantilevers of the specific row in the cantilever array;
    an X-redundancy decoder configured to stop driving the X-decoder when the at least one cantilever probe of the specific row in the cantilever array is defective and to select the X-redundancy cantilever array;
    a Y-decoder configured to receive an Y-address signal and selectively drive the specific column in the cantilever array; and
    a Y-redundancy decoder for configured to stop driving the Y-decoder when the at least one cantilever probe of the specific column in the cantilever array is defective, and to select the Y-redundancy cantilever array, and
    wherein the X-redundancy decoder comprises:
    an output terminal configured to output a stop signal to the X-decoder when the at least one cantilever probe of the specific row in the cantilever array is defective;
    a high voltage unit configured to transfer a high voltage ($V_{CC}$) to the output terminal by a specific pulse signal (XRP);
    a low voltage unit configured to receive the X-address signal and to output a low voltage (0V) to the output terminal; and
    a plurality of fuses connected between the output terminal and the low voltage unit and to selectively defuse when the at least one cantilever probe of the specific row in the cantilever array is defective.

2. The apparatus of 1, wherein the X-redundancy decoder stops driving the X-decoder when the X-redundancy cantilever array is selected.

3. The apparatus of claim 1, wherein the X-redundancy decoder converts signal values received from the high voltage unit and the low voltage unit into logical values and outputs corresponding signal values to the X-decoder and the X-redundancy cantilever array.

4. The apparatus of claim 1, wherein the fuse comprises a polysilicon line or a metal line that can be melted by using an overcurrent, cut by a laser beam or programmed by an EPROM memory cell.

5. The apparatus of claim 1, wherein the redundancy cantilever array controller further comprises:
    a Y-switch configured to receive an output signal of the Y-decoder when the at least one cantilever probe of the specific column in the cantilever array is defective, and to cut off a data output of the at least one defective cantilever probe of the specific column; and a Y-redundancy switch configured to receive an output signal of the Y-redundancy decoder when the at least one cantilever probe of the specific column in the cantilever array is defective, and to switch a data output of the Y-redundancy cantilever array.

6. The apparatus of claim 5, wherein when the Y-redundancy cantilever array is selected, the Y-redundancy decoder stops driving the Y-decoder and outputs a signal for selecting the Y-redundancy switch.

7. The apparatus of claim 5, wherein the Y-decoder comprises:
NAND gates configured to receive the Y-address signal and a signal from the Y-redundancy decoder and to turn on or off a switch of the Y-switch; and
inverters connected to the NAND gates.

8. The apparatus of claim 1, wherein the X-redundancy cantilever array includes 'p' number of rows and 'm' number of columns (p≦n, p=1, 2, 3 . . . ), and if cantilever probes of the specific row in the cantilever array having an nxm number of cantilevers are defective, cantilevers of a the specific row of the X-redundancy cantilever array are substitutively used, and meanwhile, the Y-redundancy cantilever array includes the 'n' number of rows and 'k' number of columns (k≦m, k=1, 2, 3, . . . ), and if cantilever probes of the specific column in the cantilever array having the nxm number of cantilevers are defective, cantilevers of a the specific column in the Y-redundancy cantilever array are substitutively used.

9. The apparatus of claim 1, wherein the X-decoder includes NAND gates and inverters connected to the NAND gates.

10. A storage apparatus comprising:
a cantilevery array cantilever probes;
an X-redundancy cantilever array configured to read and write information when at least one cantilever probe of a specific row in the cantilever array is defective;
a Y-redundancy cantilever array configured to read and write information when at least one cantilever probe of a specific column in the cantilever array is defective; and a redundancy cantilever array controller configured to determine that a corresponding cantilever probe is defective when the corresponding cantilever probe is unable to read and write information, and configured to select the X-redundancy cantilever array and the Y-redundancy cantilever array when the at least one cantilever probe of the specific row and of the specific column in the cantilever array is defective, wherein the redundancy cantilever controller comprises:

an X-decoder configured to receive an X-address signal and to drive cantilevers of the specific row in the cantilever array;

an X-redundancy decoder configured to stop driving the X-decoder when the at least one cantilever probe of the specific row in the cantilever array is defective and to select the X-redundancy cantilever array;

a Y-decoder configured to receive an Y-address signal and selectively drive the specific column in the cantilever array; and a Y-redundancy decoder for configured to stop driving the Y-decoder when the at least one cantilever probe of the specific column in the cantilever array is defective, and to select the Y-redundancy cantilever array, and wherein the Y-redundancy decoder comprises:

an output terminal configured to output a stop signal to the Y-decoder when the at least one cantilever probe in the specific column in the cantilever array is defective;

a high voltage unit configured to output a high voltage ($V_{CC}$) to the output terminal by a specific pulse signal (YRP);

a low voltage unit configured to receive a Y-address signal and outputting a low voltage (0V); and a plurality of fuses connected between the output terminal and the low voltage unit, and to selectively defuse when the at least one cantilever probe of a the specific column in the cantilever array is defective.

* * * * *